Aug. 28, 1956 W. B. WRAGGE 2,760,394
TORQUE MULTIPLYING BOLT-HOLDING TYPE WRENCH
Filed Oct. 16, 1953
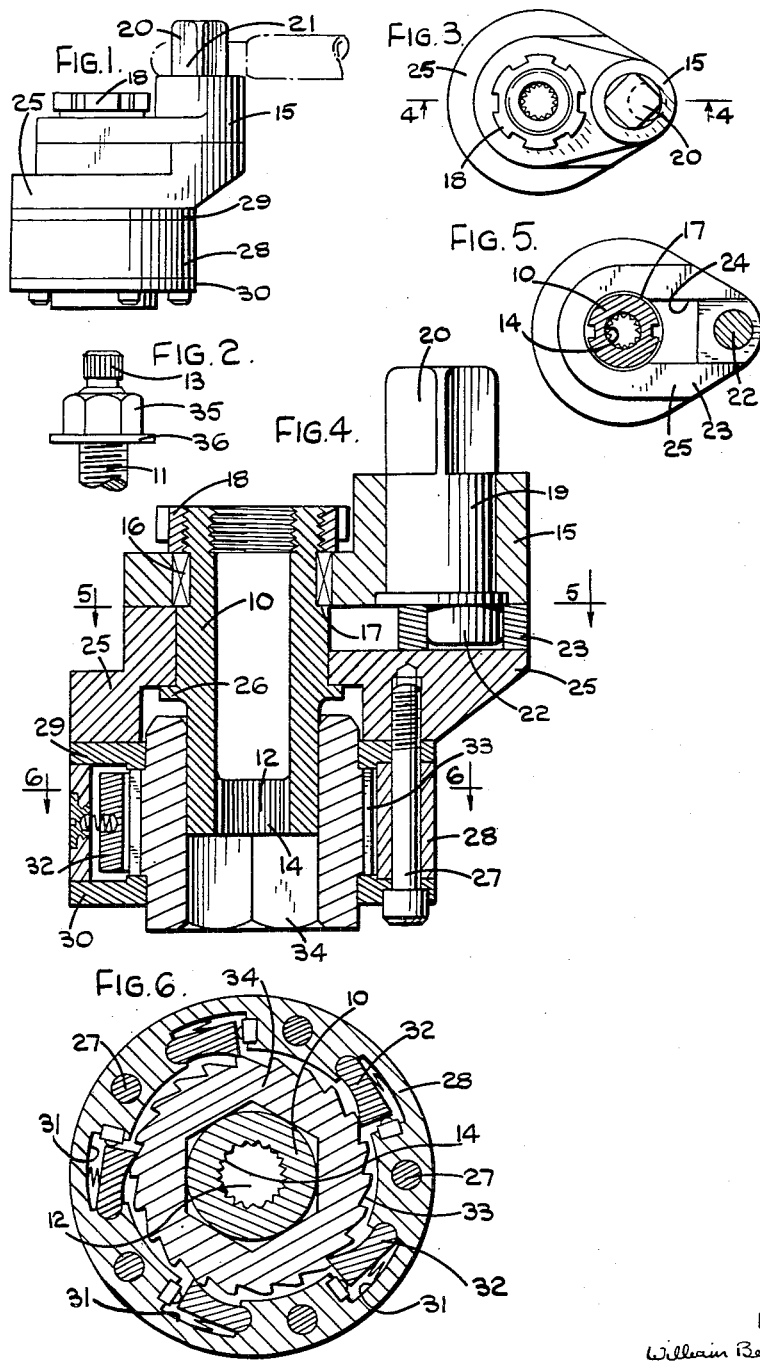
INVENTOR
William Benjamin Wragge
BY
Richardson, David and Nordon
his ATTORNEYS

United States Patent Office 2,760,394
Patented Aug. 28, 1956

2,760,394

TORQUE MULTIPLYING BOLT-HOLDING TYPE WRENCH

William Benjamin Wragge, Cheadle Hulme, England, assignor to Ledloy Limited, Woodley, near Stockport, England, a British company Application October 16, 1953, Serial No. 386,640

5 Claims. (Cl. 81—55)

This invention relates to a method of assembling structures in which parts are secured tightly together by means of bolts and nuts. The expressions "bolt" and "nut" are used herein in order to simplify terminology but it will be appreciated that the scope of the invention is not limited to the generally accepted and conventional forms of nuts and bolts, and it is capable of application with other screw-threaded fastening members and other bolt-like and nut-like fastening members which may not necessarily take the conventional form of "bolt" and "nut."

This invention further relates to a torque multiplying spanner which is adapted to provide a substantial multiplication of the torque which is applied to the spanner, so that it can be used in circumstances where it is not possible to obtain the desired torque with the conventional form of spanner. For example, in the tightening of large diameter high tensile bolts so as to obtain maximum efficiency in bolt usage, a conventional single lever spanner might need to have a leverage arm of 10 feet or so in order to achieve the desired torque with manual operation, and it is for such cases as this that the torque multiplying spanner is provided.

Previous proposals for torque multiplying spanners have involved the use of reduction gearing or a system of levers to effect the increase of torque, the spanner being provided with a second lever arm in which is fixedly located the axis of the reducing gear member, or the fulcrum of the lever system, and in practice this second arm is held in a fixed position by an operator whilst torque is applied by means of the other arm.

In any system of torque multiplication there must be a fixed reaction member upon which the reacting torque can be taken and in these proposals the fixed reaction member has to be provided by the operator holding the aforesaid second lever arm stationary which does not provide a satisfactory arrangement and also the operator has only one hand available for applying the load whilst also having to resist the reacting torque.

The object of the present invention is to provide a torque multiplying spanner of improved construction and simplified operation compared with such spanners as hitherto proposed, and in particular a spanner which will allow of the operator using both hands for applying the load.

In the drawings:

Figures 1 and 2 show the spanner being applied to the bolt for the purpose of tightening a nut thereon.

Figure 3 is a plan view.

Figure 4 is a section on the line 4—4 of Figure 3 through the spanner.

Figure 5 is a section on the line 5—5 of Figure 4.

Figure 6 is a section on the line 6—6 of Figure 4.

Referring to the drawings, Figures 1 and 2 show a spanner about to be applied to the end of a bolt for tightening a nut thereon and in the following description and claims the reference to tightening of a bolt or stud will be understood as meaning the tightening of a nut thereon. In Figure 2 the end of the bolt shank is shown, but it will be appreciated that in practice the bolt and nut would be securing together certain parts and consequently the washer shown below the nut would be in engagement with one of the parts and the spanner would be applied for the final tightening operation of the nut. Also whilst reference is made in the following description to a bolt, it will be appreciated that a similar arrangement could be applied for tightening a stud such as is more specifically referred to hereinafter.

Referring now to the sectional view of the spanner shown in Figure 4, the spanner comprises a central shaft 10 which is disposed with its axis in line with the axis of the bolt 11 when the spanner is being operated and at one end the central shaft 10 is formed or provided with a portion 12 which is adapted to have non-rotative engagement with an extension 13 provided on the end of the bolt shank.

As shown in Figure 6 the portion 12 is formed with serrations 14 and the end of the shank has the extension 13 formed with corresponding serrations for engagement by the part 12 of the central shaft so that when in engagement the central shaft is fixed on the end of the bolt shank against rotation thereon.

It will be appreciated that the portion 12 and the corresponding extension 13 on the bolt shank may take various forms some of which are more particularly described hereinafter.

The part of the spanner which is adapted to act as the reaction member takes the form of a bearing plate 15, which is keyed at 16 to the central shaft and is located between a shoulder 17 on the shaft and a locknut 18 screwed onto the upper end of the shaft so as to fix the bearing plate 15 firmly in position upon the upper end of the central shaft.

This bearing plate 15 has mounted therein a spindle 19 forming part of the torque multiplication system of the spanner, the upper end of this spindle being provided with a squared portion 20 for engagement by the end of an operating lever 21 by means of which the spindle 19 may be turned in its seating in the bearing plate 15.

At its lower end the spindle 19 has an eccentrically-disposed stub 22 upon which is mounted a sliding shoe 23 and this shoe is mounted for sliding movement in a slot 24 extending axially in respect to the central shaft 10 and provided in the upper surface of a driving plate 25 which is mounted upon the central shaft 10 between a flange 26 on the shaft and the underside of the bearing plate 15. The driving plate 25 is capable of rotation relative to the shaft 10 and is connected by means of a suitable number of screws 27 with a pawl-carrying ring 28 which is located concentrically with the axis of the central shaft 10. Retaining plates 29 and 30 are disposed between the driving plate and the pawl-carrying ring and at the outer end of the pawl-carrying ring respectively.

The pawl-carrying ring 28 is provided with a number of internal recesses 31, in each of which is mounted a pawl 32, spring pressed into engagement with the teeth on a pawl ring 33.

This pawl ring 33 is formed integrally with the nut engaging part of the spanner which is conveniently formed as a box spanner part 34 and is mounted rotatively upon the lower end of the central shaft 10.

In operation the spanner is applied to the end of the bolt so that the box spanner part 34 engages over the nut 35 and the portion 12 of the central shaft engages with the serrated extension 13 on the bolt shank. The operating lever 21 is then applied to the spindle 20 and angular movement of the operating lever produces corresponding angular movement of the driving plate 25 about the central shaft 10 with consequent multiplication of torque, the central shaft 10 being held fixed against rotation by its engagement with the end of the bolt and serving to transmit the torque reaction consequent upon torque multiplication to the shank of the bolt 11.

Torque is transmitted from the driving plate 25 through the ratchet and pawl assembly of the pawl ring 28 and ratchet wheel 33 to the box spanner 34 thus turning the nut 35.

While the above form of spanner has been described as for manual operation it will be appreciated that the construction is susceptible to power operation such as by electrical means or by utilising the known principles of applied energy or impact at present used in certain types of spanners. Power operated means may be found to be useful for relatively large bolts where the mechanical advantage provided by the spanner would involve the use of less power than that required for a spanner not having a torque multiplication characteristic.

Further it will be appreciated that the invention is not limited to the particular lever system described for torque multiplication as this may easily be replaced by an equivalent system such as reduction gearing in which case the axis of a reduction gear member would be fixedly mounted in the bearing plate 15 of the spanner.

In the arrangement described with reference to the drawing the arrangement of spindle and eccentric stud may be duplicated so that torque could be applied by means of two levers simultaneously. Also in practice where it is desired to provide some means of governing the maximum torque which can be applied when tightening a bolt or stud, the spanner may incorporate a torque measuring device or some form of torque overload devices, such as a slipping clutch which would automatically disengage the load from the nut engaging part of the spanner consequent upon a predetermined torque having been reached.

In addition to the constructions described above for providing a connection between the reaction member of the spanner and the shank of the member, bolt or stud, which is being tightened, it will be appreciated that there are other means, which will occur to those skilled in the art, for providing such connection.

For example, a bolt may be of the conventional form except that it would have a shank, threaded to the end, somewhat longer than the shank of a normal bolt and this extra threaded portion at the end could be embraced by some form of contractible clutch device, such as a split nut, which could be arranged so as to be contracted to grip the thread by means of a suitable cam or toggle arrangement associated with, and actuated from the main body of the spanner.

Again, as an alternative to the various forms of bolt and stud mentioned herein, the end of a bolt, or stud, may have an extension of plain circular cross-section concentric with the axis of the shank and the spanner may incorporate a clutch device having clutch shoes, cams, rollers or the equivalent which operate when the spanner is actuated to engage the said extension and lock the reaction member of the spanner to the bolt or stud. Such an arrangement might also be used with the bolt or stud as mentioned in the previous paragraph, the clutch members (cams, rollers etc.) being serrated to engage the thread on the end of the bolt.

With such arrangements, the greater the applied torque on the spanner then the greater will be the grip on the bolt or stud.

Summarizing therefore in the performance of the method, the spanner is applied to the end of the bolt in the manner shown in Figures 1 and 2 so that the box spanner portion 34 engages over the nut 35 and the socket portion 12 engages the extension 13 on the bolt. The operating lever 21 is then applied and given angular or rotary movement so as to turn the spindle 20, thereby transmitting multiplied torque via the driving plate 25 to the pawl ring 28 which in turn transmits the torque to the box spanner portion 34. The reaction member 15 transmits the reaction torque to the central shaft 10 which by virtue of its non-rotative connection with the extension 13 on the bolt thereby causes the reaction torque to be taken upon the shank of the bolt.

From the foregoing it will be seen that the present invention provides a method of assembling structures wherein parts are secured together by bolts and nuts and tightened with the aid of a torque multiplying device, in which the disadvantage attached to prior proposals, of the operator having to manipulate a second lever to provide for torque reaction, is eliminated by the novel step of causing torque reaction to be taken on the bolt itself or on a washer associated therewith.

It will be appreciated that the method may be also adapted for the loosening of bolts.

What I claim then is:

1. A torque multiplying spanner for tightening a nut upon a bolt comprising a bolt-engaging member having a part which is adapted to have non-rotative mechanical engagement with the end of the bolt remote from the head thereof, a nut engaging member having a socket portion adapted to have non-rotative engagement with the nut, a torque multiplying lever system including a spindle mounted in said bolt engaging member and disposed parallel to the axis of said socket portion, an operating member for turning said spindle about the axis, part of said spindle being disposed eccentrically in relation to the axis thereof and means for transmitting torque from said eccentric part of the spindle to said socket portion.

2. A torque multiplying spanner for tightening a nut upon a bolt comprising, a central shaft one end whereof is adapted to have non-rotative mechanical engagement with the end of the bolt remote from the head thereof, a nut engaging member having a socket portion adapted to have non-rotative engagement with the nut, and having its axis in line with said central shaft, a bearing plate fixed to said central shaft, a torque multiplying lever system including a spindle mounted in said bearing plate and disposed parallel to the axis of said socket portion, an operating member for turning said spindle about its axis, and means for transmitting torque from said lever system, to said socket portion.

3. A torque multiplying spanner for tightening a nut upon a bolt comprising a central shaft one end whereof is adapted to have non-rotative mechanical engagement with the end of the bolt remote from the head thereof a driving plate mounted upon said central shaft for angular movement about the axis thereof, said driving plate having a socket portion adapted to have non-rotative engagement with the nut, a bearing plate fixed to said central shaft, a torque multiplying lever system including a spindle mounted in said bearing plate and disposed parallel to the axis of said socket portion an operating member for turning said spindle about its axis, part of said spindle being disposed eccentrically in relation to the axis thereof the eccentric part of said spindle carrying a shoe which is slidable in a slot provided in said driving plate, and means for transmitting torque from said driving plate to said socket portion.

4. A spanner according to claim 3 wherein said driving plate is connected to one member of a ratchet and pawl assembly the other member whereof is connected to said socket portion.

5. A torque multiplying spanner for tightening a nut upon a bolt comprising, a spanner body, a bolt engaging member fixedly secured to said body and having an integral part which is adapted to have non-rotative mechanical engagement with the end of the bolt remote from the head thereof, a nut engaging member rotatably mounted in the spanner body and having a socket portion adapted to have non-rotative engagement with the nut, a torque multiplying mechanical system mounted in the spanner body, an operating spindle for said system mounted rotatably in the spanner body and fixed in position in said body relatively to said bolt-engaging member and means for transmitting torque from said torque multiplying system to the nut engaging member.

References Cited in the file of this patent

UNITED STATES PATENTS

| | | |
|---|---|---|
| 1,137,433 | Swartwood | Apr. 27, 1915 |
| 1,139,479 | Brightman | May 18, 1915 |
| 1,373,045 | Bernhard | Mar. 29, 1921 |
| 1,412,552 | Carlson et al. | Apr. 11, 1922 |
| 1,426,098 | Pruitt | Aug. 15, 1922 |
| 1,483,019 | Smith et al. | Feb. 5, 1924 |
| 1,820,556 | Campbell et al. | Aug. 25, 1931 |
| 2,014,718 | Carington | Sept. 17, 1935 |
| 2,237,236 | Matthews | Apr. 1, 1941 |
| 2,267,012 | Bowne | Dec. 23, 1941 |
| 2,388,658 | Pumphrey | Nov. 6, 1945 |
| 2,394,027 | Vlass | Feb. 5, 1946 |
| 2,417,757 | Hoff | Mar. 18, 1947 |
| 2,421,181 | Batchelder | May 27, 1947 |